United States Patent [19]

Sena

[11] 4,151,680
[45] May 1, 1979

[54] MODULAR HORTICULTURAL STRUCTURE

[76] Inventor: August M. Sena, P.O. Box 134, Hillsdale, N.Y. 12529

[21] Appl. No.: 799,149

[22] Filed: May 23, 1977

[51] Int. Cl.$^2$ .............................................. A01G 9/02
[52] U.S. Cl. ........................................ 47/39; 47/66; 47/69; 47/83; 47/67; 47/71
[58] Field of Search ...................................... 47/66–67, 47/71, 83, 39, 82, 69

[56] References Cited

U.S. PATENT DOCUMENTS

| | | | |
|---|---|---|---|
| 3,076,289 | 2/1963 | Gallo | 47/39 |
| 3,076,290 | 2/1963 | Gallo | 47/83 |
| 3,079,037 | 2/1963 | Schechter | 47/71 X |
| 3,374,574 | 3/1968 | Haile | 47/83 |
| 3,686,791 | 8/1972 | Mills | 47/83 |
| 4,057,931 | 11/1977 | Stutelberg et al. | 47/66 |

Primary Examiner—Robert E. Bagwill
Attorney, Agent, or Firm—Delavan P. Smith

[57] ABSTRACT

A modular horticultural structure and container system for storage and arrangement of articles more particularly plants, flowers and the like capable of inter-connection for various horizontal and vertical displays and arrangements. The modular system extend from a base and container having co-operating elements therebetween and interocculuded spaces for co-operation with supporting structures and inter-container facing and mounting devices. Each of the base-containers is adapted to be supported in space, in horizontal and vertical relationship between each other and are adapted to be used with conventional flower pots and display apparatus.

1 Claim, 26 Drawing Figures

U.S. Patent May 1, 1979 Sheet 1 of 4 4,151,680
FIG.1
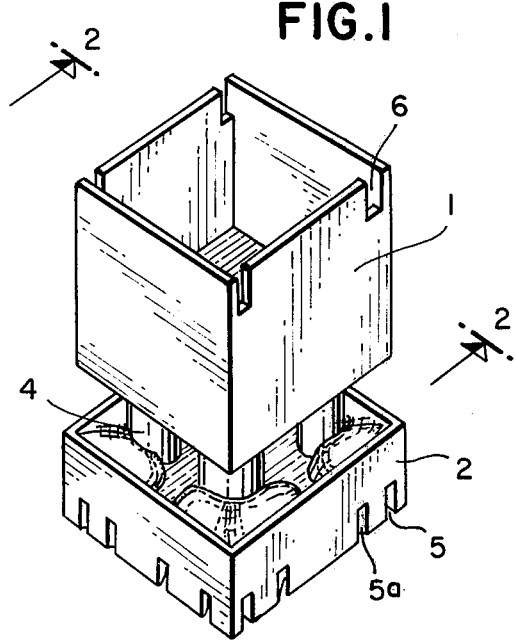
FIG.2
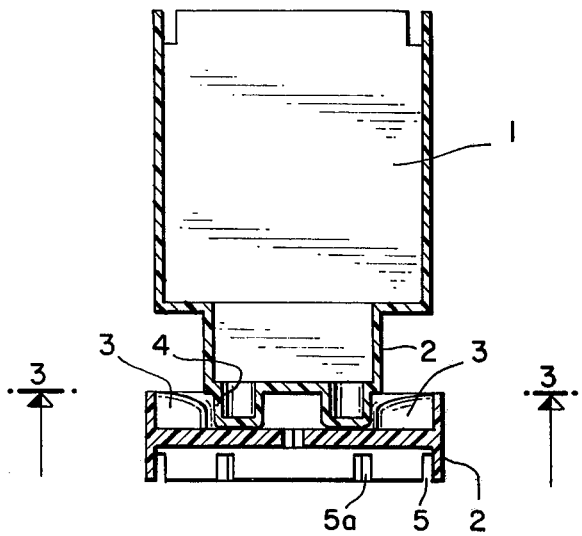
FIG.3
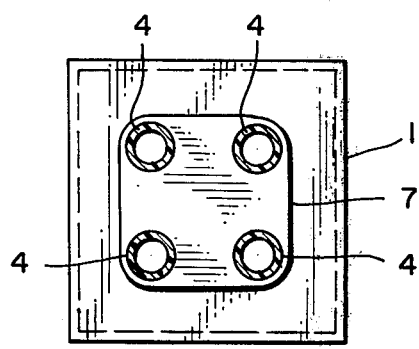
FIG.4
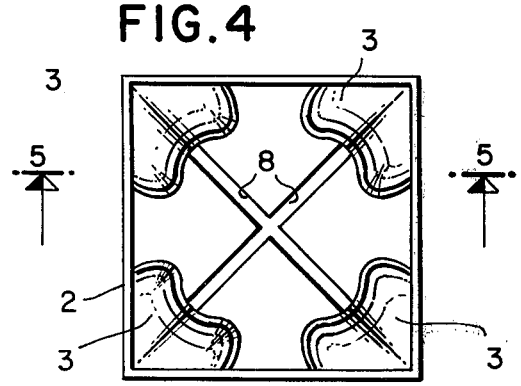
FIG.6
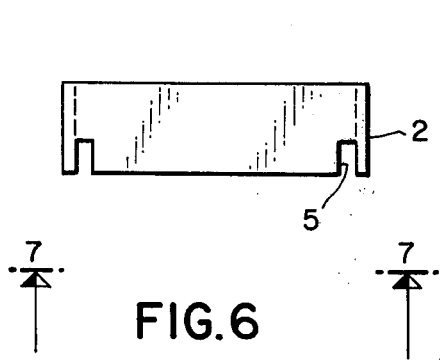
FIG.5 / FIG.7
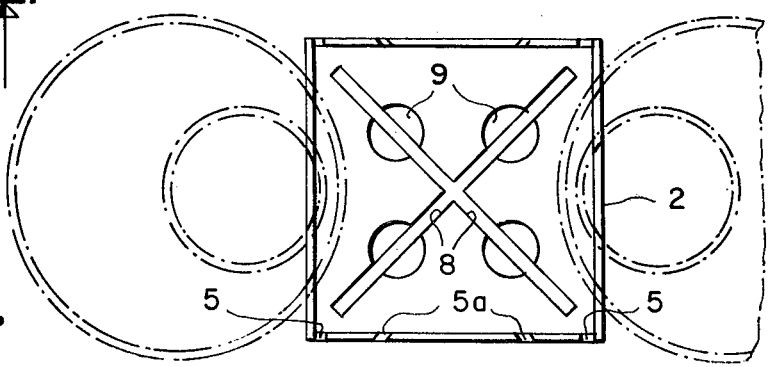

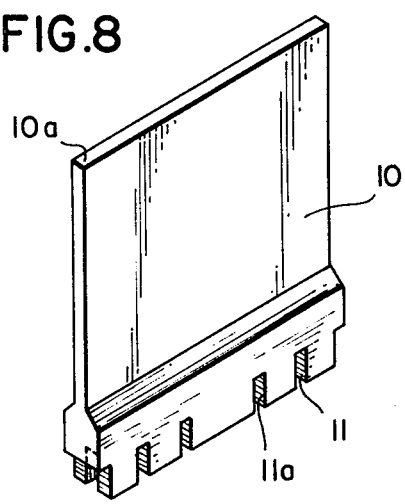
FIG.8
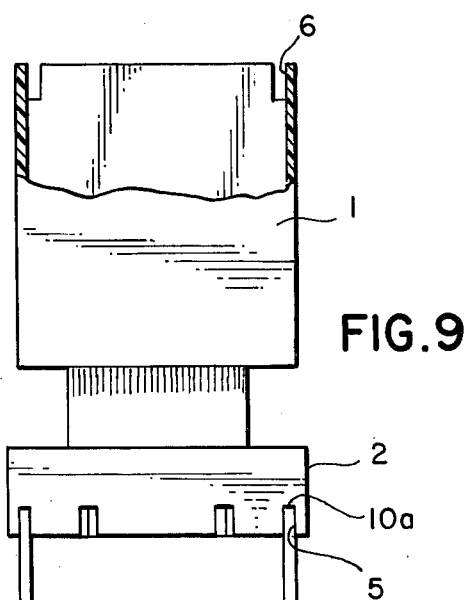
FIG.9
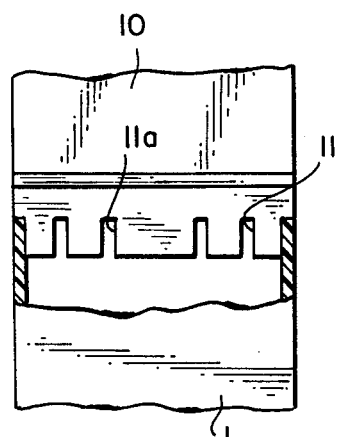
FIG.10
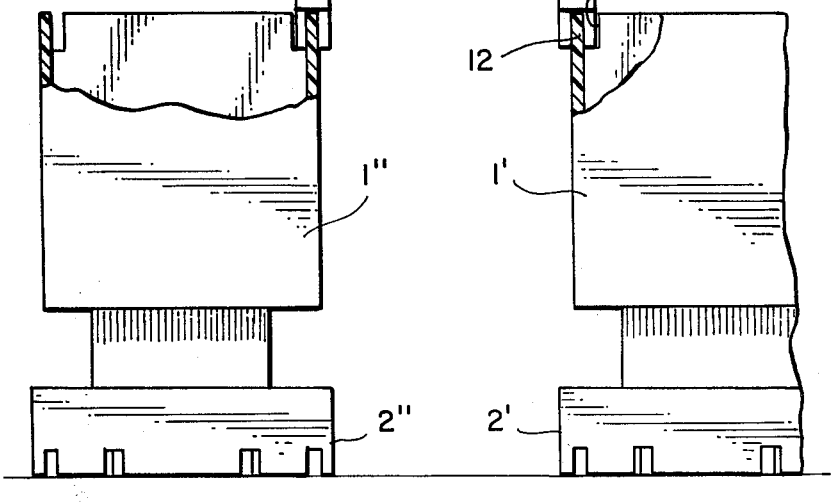
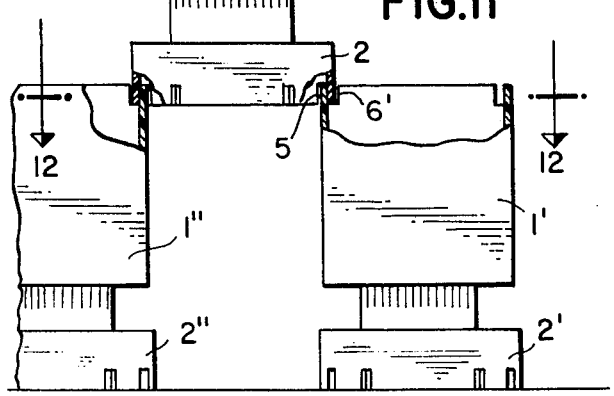
FIG.11
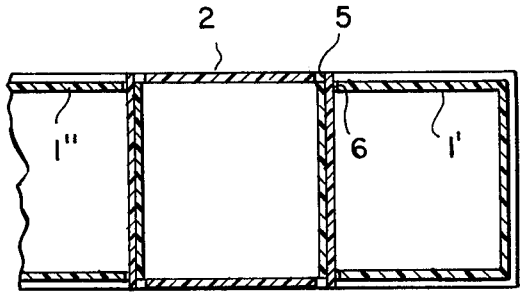
FIG.12

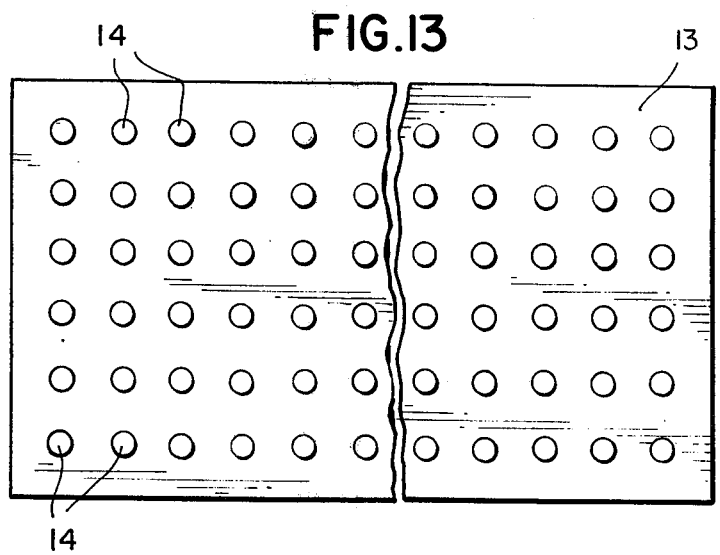
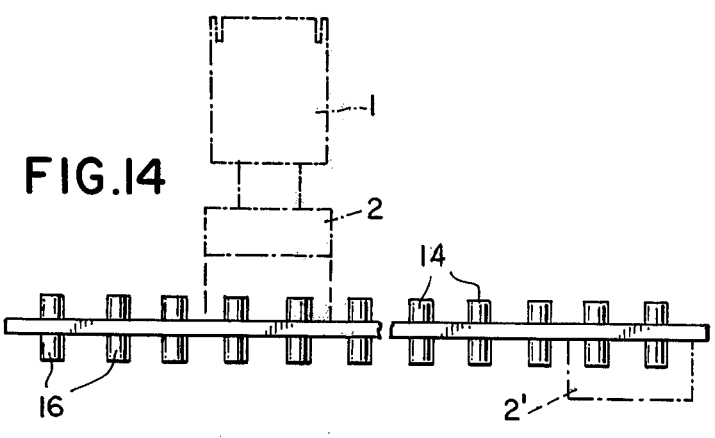
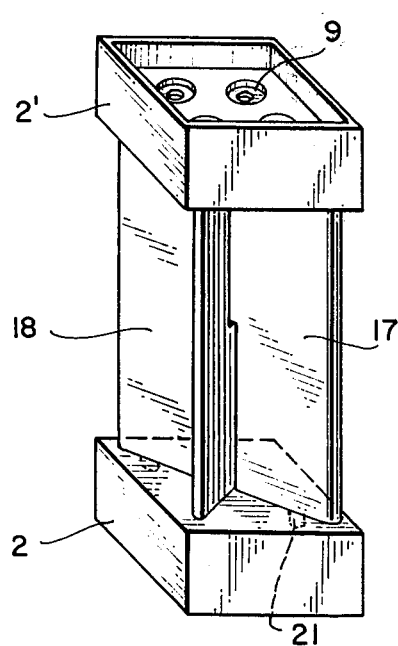
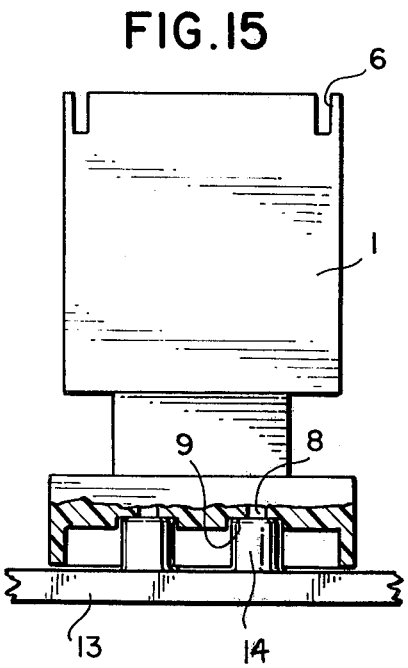
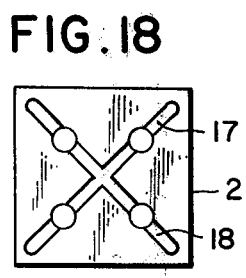
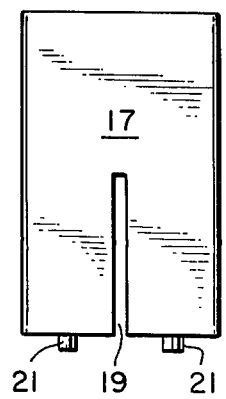
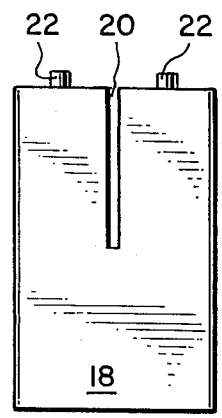

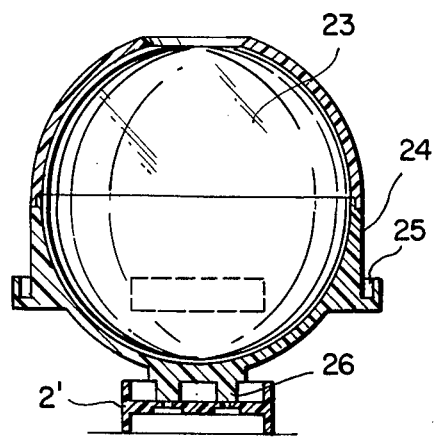
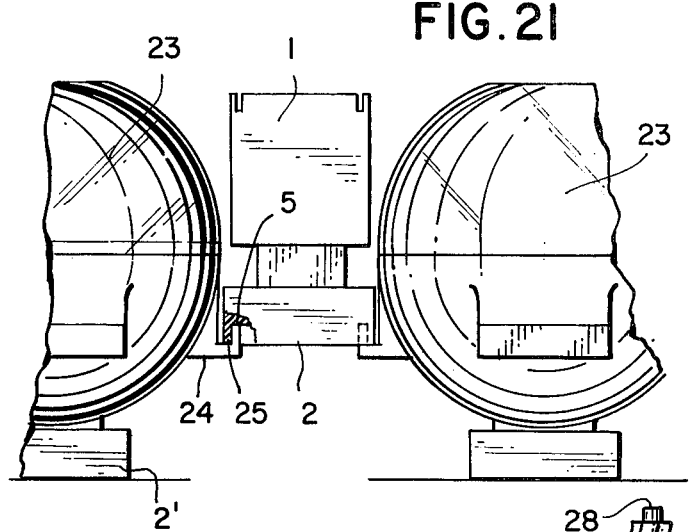
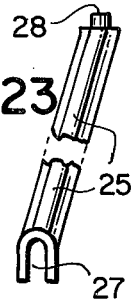
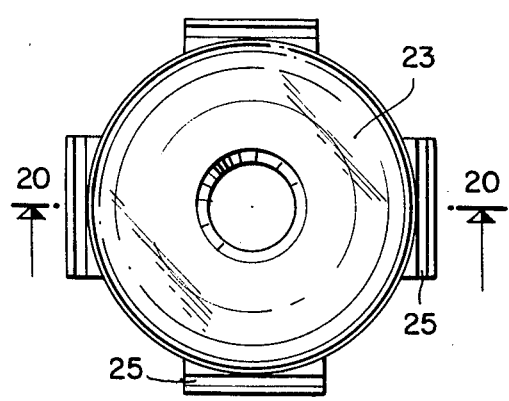
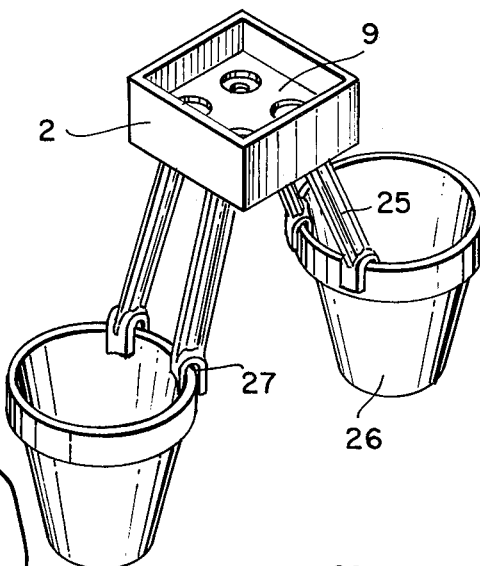
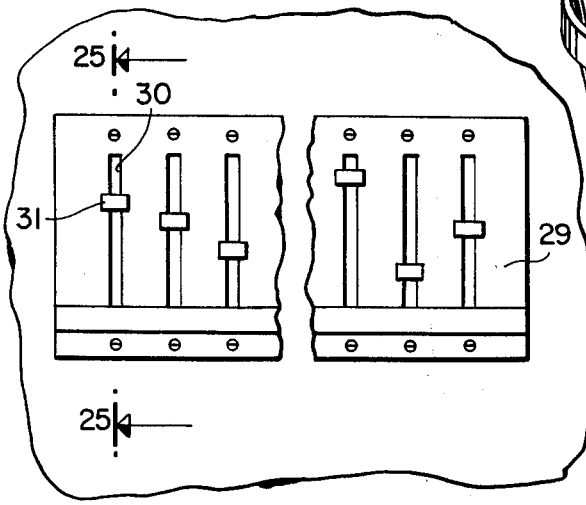
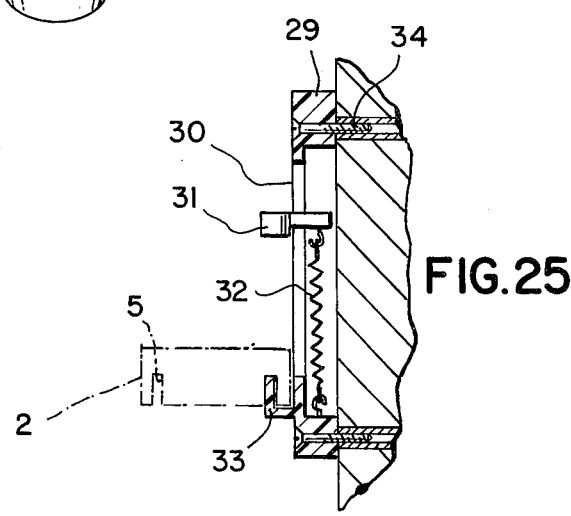

MODULAR HORTICULTURAL STRUCTURE

BACKGROUND OF THE INVENTION

Planter systems for stacking and combining containers for the display and maintenance of plants and flowers have been known heretofore in many modular and non-modular structures. See e.g., U.S. Pat. No. 307,936 to Frey, patented Nov. 11, 1884. The Frey patent as in many prior structures various containers are spaced in relationship to each other so as to become unitized although providing separate containers isolating the various plants to be maintained and exhibited.

The Frey disclosure shows the various containers located in vertical arrangement. Other systems are capable of use in a horizontal direction. In these arrangements the individual containers are restrained from lateral movement from each other by a pierced receptacle as shown in U.S. Pat. No. 3,852,912 to Diller, patented Dec. 10, 1974. It is also known to use stacked arrangements for flower pots and garden containers using interlinking parts to maintain the relationship between the containers. Such structures are shown, e.g., in U.S. Pat. Nos. 3,076,289 and 3,076,290 to Gallo, issued Feb. 5, 1963.

The advent of inexpensive injection and cast plastic molding procedures of great strength and wear-resistance has made desirable flower and garden containers having shapes capable of being molded in high quantities by such plastic formation method and at the same time provide a practical interlocking of members providing many pleasing designs.

The prior structures, as in the Gallo patents, do not provide an overall planter system for interspacing and linking the containers but rather are added parts for linking the various pots and containers together.

SUMMARY AND ADVANTAGES OF THE INVENTION

The invention comprises a system of co-operating modular parts to produce a co-operating display and container system providing varied, decorative and useful arrangements of versatile and diverse size. Each of the parts of the present planter system uses various inter-facing portions adapted to co-operate together.

In general, the device uses a container and a base combination which can be arranged in an inter-connecting lattice of containers or can be separated and inter-connected or used separately by especially co-operating mechanical parts. While the container is especially useful in connection with planter arrangements for gardening and soil and vegetative containment, its use is possible in connection with any display of small and medium articles.

It is still a further object of the invention to provide co-operating portions of the system for varying the horizontal and vertical spaces between the containers and for mounting the containers in various ways best suited for the type of floral or other material to be used in the container. Other objects of the invention is to provide a spherical container or terrarium co-operating with the basic container-base arrangements, a shelf mounting arrangement and a wall mounting system for the base container.

Further advantages of the invention, as well as a complete understanding thereof may be obtained from the following descriptions.

BRIEF DESCRIPTION OF THE DRAWINGS

FIG. 1 is an issometric view of a base and container used in practicing the invention. The container is shown in place upon the base used in a preferred embodiment of the invention.

FIG. 2 shows a schematic sectional view of the base conatiner along a plane 2—2 of the arrangement shown in FIG. 1.

FIG. 3 is a bottom view of the container of FIG. 1.

FIGS. 4, 5, 6 and 7 comprise various views and sections of the base used in practicing the invention.

FIGS. 8, 9 and 10 are various views of a planer spacer to be used in connection with the base-container shown in FIG. 1.

FIGS. 11 and 12 show inter-connection of various container-base units of the type shown issometrically in FIG. 1 in elevation and plan view.

FIGS. 13, 14 and 15 show various views of a shelf to provide a horizontal combination of the container-bases of FIG. 1 and the mounting inter-connections between such a shelf and the base container.

FIGS. 16, 17a, 17b and 18 show two base units inter-spaced by inter-locking vanes as a further modification of the invention.

FIGS. 19, 20 and 21 show the use of a terrarium sphere for inter-connection between the base-container arrangements.

FIGS. 22 and 23 how an adaptation for connection of the base with conventional flower pots.

FIGS. 24 and 25 show a wall mounting arrangement for the container-base combination shown in FIG. 1.

DESCRIPTION OF THE PREFERRED EMBODIMENT

FIG. 1, the isometric view, shows a container combined with a base 2 to form the principal units of a planter system. The container 1, which will ordinarily have its base sealed to be water tight, fits into the base 2 which has formed upper surfaces 3 to receive protrusions 4 of the container. This forms a tight fit between 3 and 4 so that units 1 and 2 are fitted together. There are slots 5 on base 2 which are placed in such a way as to co-operate with various other parts of the planter system. These may, e.g., mesh with slots similiar to 6 that will be found on other containers similiar to 1 and co-operating with the base. Both the base and container are preferably made of injection molded or otherwise formed plastic having a relatively high tensile strength and being low in creep properties so that dimensions of the various parts and slots will not vary substantially with age or use.

While a top opening container is shown in the drawings, it will be understood by those in the art that other and various containers can be utilized with preforations, enclosures and dividers without varying from the teachings of the invention.

The container-base of FIG. 1 at sections 2—2 is seen at FIG. 2 of the various parts and their co-operation can be more easily seen. Thus the circular protrusions 4, nicely fitting within the molded surfaces 3, for maintaining the stability between the container 1 and the base 2 are shown. The configuration of protrusions 4 can be seen in the view looking upwards at container 1, where the circular protrusions 4 molded as a portion of the bottom of container 1. the height of 7 is variable or may be eliminated altogether, depending upon the spacing desired between base 2 and container 1.

A plan view is shown at FIG. 4 of the base 2. Surfaces 3 are fitted, molded or cemented to base 2. The plan also shows x-slots 8 molded cut into the base. These are used in other embodiments including the base 2, later to be described. The internal arrangements of the base are shown in the section view FIG. 5, taken along section 5—5 of FIG. 4. The elevation, FIG. 6, taken at 6—6 of FIG. 5, shows mounting slots 5 in detail. These slots can be a portion of the injection molding die or may be machined.

Referring to FIG. 5, directly beneath x-slots 8 are holes or preforations 9 used in connection with other embodiments of this invention. FIG. 7 is a bottom view of the base 2, showing x-slots 8, the mounting slots 5, all part of the base 2 are shown in detail. The slots 5a shown in FIGS. 2, 5 and 7 are mitred slots which can accommodate mounting rings, typically shown at 5a and 5b of FIG. 7.

One basic embodiment of the invention which requires no further co-operating parts for the assembly of a planter or display arrangement can be seen in FIG. 11. Slots 5 in the base 2 couple with slots 6' in the container 1'. 1' and 6' are comparable in successive units to elements 1 and 6 in FIG. 1. It will be apparent to those skilled in the art that the sizes of the slots 5 and 6' must be appropriately fitted to provide close intercoupling between units 2 and 1'. Similiarly it can easily be seen that additional units similar to container-base 1'-2' and 1"-2" can be used to co-operate with the original container 1-2 to form a complete display.

Such co-operating planter units are viewed in plan in FIG. 12 along section 12—12 in FIG. 11 and compare the base 2, the container 1' and 1" in their inter-relation. This shows, e.g., the connection at slots 5 and 6'.

The benefit of this construction will be obvious to all persons skilled in the art in that any number of containers can be used to extend the planter system either in a vertical or horizontal direction to make such displays as wide or as tall as necessary. The height of the planter arrangement will, of course, be limited by the strength of the materials used in the various base-containers.

Referring to FIG. 8 where additional vertical space is required between the varied space container units, a panel 10 can be made out of a plastic or metallic material either by extrusion or forming. In the present application material similiar to the material used in the container-base 1-2 has been used. Metal, or any other product may give additional strength and resistance to fatigue when used in co-operation with container-base combinations. Slots similiar to 11 and 11a perform comparable functions to slots 5 and 5a in base 2 and can be utilized to interconnect panel 10 with other units. Slot 12 can be used to provide connection to container 1' and 1" as shown at FIG. 9. The upper portion of panel 10 and the container-base units 1-2 are also shown more particularly in FIG. 9 with an upper surface 10a being fitted into the slots 5 of container 2. The lower slot 12 on panel 10 fits directly to the side walls of adjoining containers 1' and 1".

The height of panel 10 can be varied to provide a desired vertical dispersion or clearance between various container-base units 1-2. In practice, it has been found that panel 10 can be about the same height as the container 1 providing a pleasing aspect ratio therebetween and an appropriate mechanical strength at the connections.

Another embodiment of the invention utilizing a shelf is shown in FIG. 13. This provides a horizontal planter display designed to co-operate with the container-base arrangement 1-2. The shelf itself 13, has bosses 14 located in various ranks and columns on the upper portion of the shelf 13 and may have bosses 16 on the underside of the shelf similiarly arranged. The spacing in the various ranks and columns is made in such a way that it will co-operate with the base-container 1-2 as more clearly shown in FIG. 14 where elements 14 have a diameter and height that engage the holes 9 shown in FIG. 7, thereby preventing lateral movement of the base-container but allowing free removal of the base or container from the shelf for changing the display. As shown in FIG. 15, the fit between the hole 9 and the boss 14 should be sufficiently tight so that a snap fit is achieved between base 2 and shelf 13.

If it is desired, the shelf itself can in turn be mounted upon one of the typical bases previously described and displayed at 2'. It may be recalled from FIG. 4 that shoulders 3 have a certain spacing which can be used to restrain the movement between the bosses on container 1. These are easily adaptable to co-operating with bosses 16 on the underside of shelf 13, as shown in FIG. 14.

Still a further embodiment of the invention is adapted for co-operation with the planter system. This is shown in FIG. 16 and employs two vanes 17 and 18 as exemplified in FIGS. 17a and 17b and are elements having elongated slots 19 and 20. These slots having suitable dimensions so that vanes 17 and 18 may be firmly attached together at right angles to provide the result shown in FIG. 16. When this is done, the bosses or extensions corresponding to 21 will fit against the surfaces 3 on base 2. The upper boss 22 is adapted to fit into the under holes 9 of the base 2'. In FIG. 16 the surfaces 3 have been eliminated for clarity so that the co-operation between the parts can be more easily seen.

Displacement of vanes 17 and 18 is shown in plan at FIG. 18.

A further embodiment of the invention where the container-base co-operates with a terrarium 23 is shown in FIG. 21. The terrarium is preferably a spherical container shown in elevation and plan in FIGS. 20 and 19 respectively. The terrarium shoulders 24 molded into or cemented to the spherical portion. Shoulders 24 have upward opening slots 25 and a base configuration including protrusions 26. These are dimensionally arranged to fit into the previously described base 2. This provides at once, an arrangement shown in FIG. 21 to support the container-base arrangement 1-2 through the adaption of the slots 25 to the slots 5 on base 2. At the same time, the bottom configuration of the terrarium will mesh to the surface 3 contained on the upper portion of the base 2' as shown in FIG. 20 which is a typical base 2 shown in the other embodiments of the invention.

Connections between any typical base 2 of the invention can be made with other flower pots by the use of connecting legs attached to the base 2 and to ordinary flower pots as 26 shown in FIG. 22. Naturally the lower portions 27, of these connecting legs must be made with a suitable dimension and curvature that will co-operate with comparably sized flower pots. The upper end 28, shown in FIG. 23, of connecting leg 25 is adapted to be received by holes 9 of a typical base 2" as shown together in FIG. 22.

A further embodiment of the invention whereby base-connector combination can be wall mounted is shown in FIGS. 24 and 25. A wall mounting panel 29 has slots similiar to 30 placed therein. This panel may be of plastic or metallic construction depending upon the strength and appearance required. FIG. 25 is section 26—26 taken thru FIG. 24 at the position of the slot 30. It shows a slider 31 which engages the upper portion of a container used in a container-base combination mounted between the slider 31 at its upper end and a channel portion 33 of panel 29. The spring 32 will cause the container-base combination to be locked against the panel. The entire panel 29 can be mounted to any vertical surface by means of screws or other mechanical attachments, typically shown at 34.

While particular structures and embodiments have been shown and described herein, it is obvious that other adaptions and modifications can be made by those skilled in the art without departing from the scope and spirit of the appended claim.

I claim:

1. A modular horticulture structure assembly set comprising at least one container, said at least one container comprising a rectangular container, said container including an open top side walls and a bottom wall, a pair of vertical slots in each of opposite side walls, adjacent the four corners of said container, and extending downwardly from the open top, four spaced protuberances extending downwardly from the bottom wall of said container, and a rectangular base, said base divided into an upper section and a lower section, said upper section and lower section having a divider across said base, said upper section of said base including raised portions, said raised portions and said protrusions being so dimensioned that said raised portions tightly grip said protrusions on said container, said lower section of said base including side walls with corresponding corners, a pair of downwardly opening slots which are closely adjacent to and flanking each of said corners, and at least a pair of downwardly opening mitred slots intermediate of each of said side walls.

* * * * *